Jan. 28, 1958 S. JEFFERSON 2,821,636
GO-DEVILS
Filed April 18, 1955 2 Sheets-Sheet 1

SIDNEY JEFFERSON
Inventor
By *Larson and Whiting*
Attorney

Jan. 28, 1958 S. JEFFERSON 2,821,636
GO-DEVILS
Filed April 18, 1955 2 Sheets-Sheet 2

Sidney Jefferson
Inventor
By Larson and Whiting
Attorney

United States Patent Office 2,821,636
Patented Jan. 28, 1958

2,821,636

GO-DEVILS

Sidney Jefferson, Abingdon, England, assignor, by mesne assignments, to the United States of America as represented by the United States Atomic Energy Commission Application April 18, 1955, Serial No. 502,176

4 Claims. (Cl. 250—106)

This invention relates to go-devils which are passed through pipe lines mainly for the purpose of clearing the walls of sludge, scale or the like.

It is not uncommon for a go-devil to become jammed in a pipe line, and it has been proposed to incorporate in or attach a source of radio-activity to a go-devil so that the go-devil may be located inside the pipe, possibly under several feet of earth, by means of a detector of radio-activity.

For this method of detection it is necessary, however, for the source to have a level of activity which is dangerous at a distance of, say, one foot in the absence of a screen.

In consequence, the loading of the go-devil with the active source has to be carried out with remote handling tools and as fast as possible. The loading of the source into the go-devil when everything is clean is in practice fairly straightforward, but unloading can be extremely difficult particularly in oil pipelines because the sludge in the pipeline penetrates everywhere and is liable to obstruct the undoing of the source fixing arrangements. The unloading procedure is quite difficult even at a reception go-devil receiving trap, but when the go-devil sticks part-way down the pipeline and the pipeline has to be cut in order to extract the go-devil, the unloading operation can be really difficult and frought with some danger.

An object of the present invention is to reduce or eliminate the above mentioned danger and to this end, according to the present invention, a device adapted to be incorporated in or attached to a go-devil comprises a screening pot, a radio-active source holder, means mounting said pot and said holder for relative movement of the holder in and out of the pot and a pressure sensitive device adapted to operate said means whereby at atmospheric pressure a source in said holder is contained in and shielded by the pot whereas at the operating pressure in a pipe line in which the device is to be used the source is withdrawn from and is unshielded by said pot.

Figure 1:
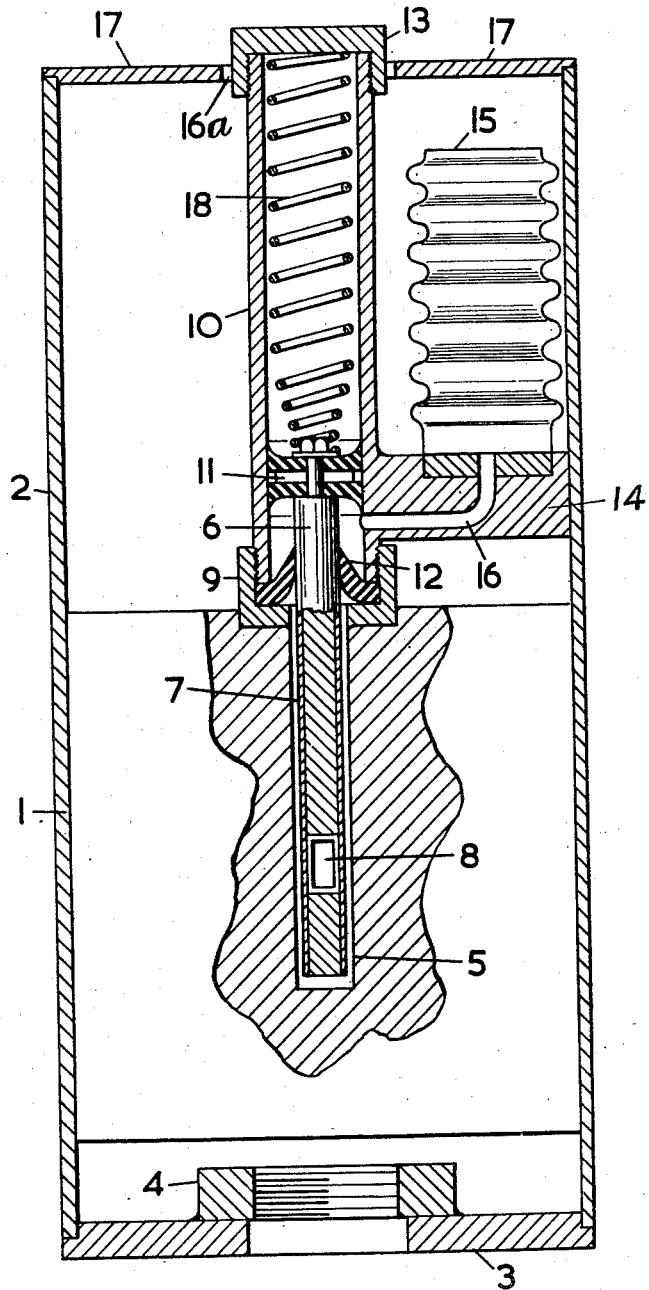
Figure 2:
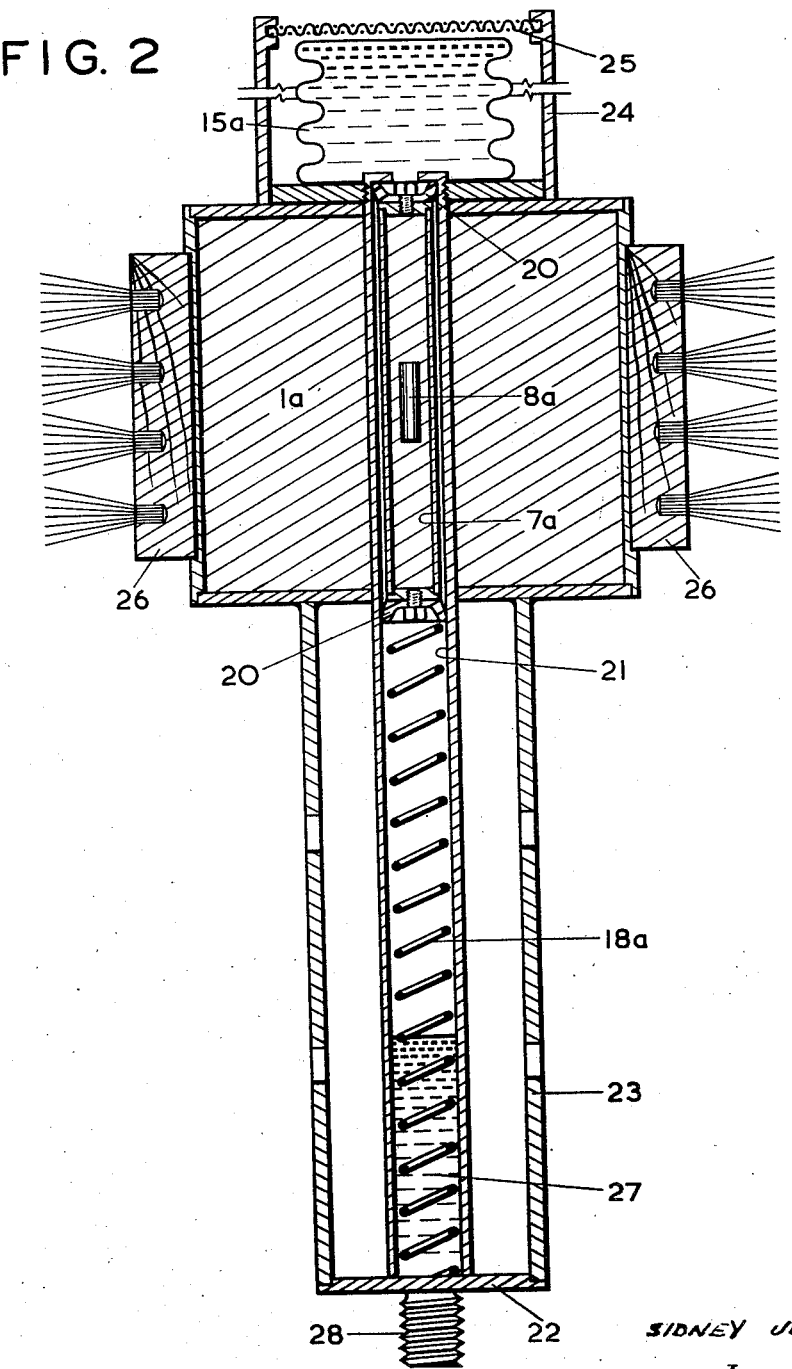

Embodiments of the invention will now be described with reference to the accompanying drawings in which:

Fig. 1 is a longitudinal cross section of a device housing a source of radio-activity, and Fig. 2 is a view similar to Fig. 1 of a modified form of the device.

Referring to Fig. 1 a lead pot 1 is housed in a cylindrical container 2 provided in one of its end plates 3 with a threaded member 4 adapted to screw on to a threaded central tow bar of a go-devil.

The lead pot 1 consists of a cylindrical mass of lead with a small axial bore 5 extending about three quarters of the way from one end. In the bore 5 is a plunger 6 comprising a metal tube 7 filled with lead except for a short portion at the centre of the pot where a radioactive source 8 is housed.

At the mouth of the bore 5 is a flanged and threaded member 9 into which a hydraulic cylinder 10 is screwed and in the cylinder is a piston 11 consisting of two rubber cups mounted back-to-back on a threaded extension of the tube 7. A gland 12 is provided where the tube 7 enters the cylinder 10 and the outer end of the cylinder is closed by a cap 13.

A lug 14 extending from the cylinder 10 carries a metal bellows 15 the inside of which communicates with the glanded end of the cylinder through a bore 16.

The outside of the bellows 15 is subject to the pressure obtaining outside the casing 2 by virtue of an annular vent 16a between the cap 13 and an end wall 17 of the casing 2. The parts are shown in the position they occupy under atmospheric pressure so that normally the source 8 is at the centre of the pot 1 and adequately screened. At an external pressure of two or three atmospheres the bellows 15 are compressed and oil contained therein is forced into the cylinder 10 causing the piston 11 to move out of the bore 5 compressing air and a spring 18 contained in the cylinder 10 and moving the source 8 to a position outside the pot 1. On reduction of the external pressure the piston is moved back by the spring 18 and by the pressure of the air in the cylinder 10 and the source 8 is returned to the shielded position inside the pot 1.

The preferred embodiment of the invention is shown in Fig. 2. A radioactive source 8a is contained in a lead filled tube 7a fitted at each end with a rubber cup 20 so as to constitute a free piston in a cylinder 21, part of which constitutes a lining for an axial bore in a lead pot 1a. The greater part of the cylinder 21 projects forwardly from the pot 1a and is closed at its front end by a plate 22 carrying a threaded spigot 28 by means of which the device may be attached to a towing means. The plate 22 also forms the end of a cylindrical protective casing 23 for the cylinder 21.

Normally, i. e. at normal ambient pressure, the piston 7a is maintained in the position shown by means of a helical compression spring 18a. In this position the source 8a is substantially at the centre of the pot 1a and is fully screened. The rear end of the cylinder 21 communicates with the inside of a metal bellows 15a secured to the rear end wall of the pot 1a. The bellows is protected by a cylindrical casing 24 in the end of which is a filter 25.

Four radially extending brushes 26 (two only are shown in the section) are arranged at equal intervals around the circumference of the pot 1a so as to locate the device centrally within a pipeline.

The device of Fig. 2 operates very similarly to that of Fig. 1. When a high pressure such as normally obtains in a pipeline is applied to the bellows 15a, oil contained therein is forced into the cylinder 21 and drives the piston 7a against the action of the spring 18a and the pressure of air in the cylinder to a position in which the source 8a is outside the lead pot 1a and is thus substantially unscreened. The spring is prevented from being compressed solid by a predetermined quantity of oil 27 introduced into cylinder 21. The arrangement is such that a pressure balance always exists between the inside and outside of the cylinder.

By means of either embodiment of the invention the source is screened during the operations of fixing the device to a go-devil, feeding the go-devil and the device inside the spare length of piping in a go-devil hatch, and fitting the spare length into a pipeline and fastening up the pipe couplings. When the pressure is raised in the go-devil hatch, the movement of the source 8 to a position outside the screening pot 1 can easily be checked with a radiation monitor, and then the go-devil can be released down the pipeline.

When it is desired to withdraw the go-devil and the attachment from the pipeline, either at a go-devil receiving trap or at some intermediate point where excavation is necessary, reduction of pipeline pressure results in the source becoming completely screened again, so preventing any radiation hazard during its withdrawal.

I claim:
1. A device for housing a source of radio-activity to be associated with a go-devil for a pipeline comprising a screening pot, a holder for said source, means providing for relative displacement of said pot and said holder between a screened and an exposed condition of the source, means for effecting displacement towards the screened condition and means sensitive to the hydraulic pressure in the pipeline for effecting displacement towards the exposed condition.

2. A device as claimed in claim 1 wherein the means providing said relative displacement comprises a hydraulic piston and cylinder.

3. A device as claimed in claim 2 wherein the means sensitive to the hydraulic pressure in the pipeline comprises a bellows connected with said cylinder.

4. A device as claimed in claim 3 wherein the piston constitutes the source holder.

References Cited in the file of this patent
UNITED STATES PATENTS

| | | |
|---|---|---|
| 2,648,778 | Silverman et al. | Aug. 11, 1953 |
| 2,670,443 | Pennock et al. | Feb. 23, 1954 |

OTHER REFERENCES

Radioactive Isotopes as Tracers, by A. W. Kramer, from Power Plant Engineering, November 1947, pp. 105–108.